No. 654,235. Patented July 24, 1900.
W. E. DOW.
SPRAYING PUMP.
(Application filed Nov. 16, 1899.)
(No Model.)
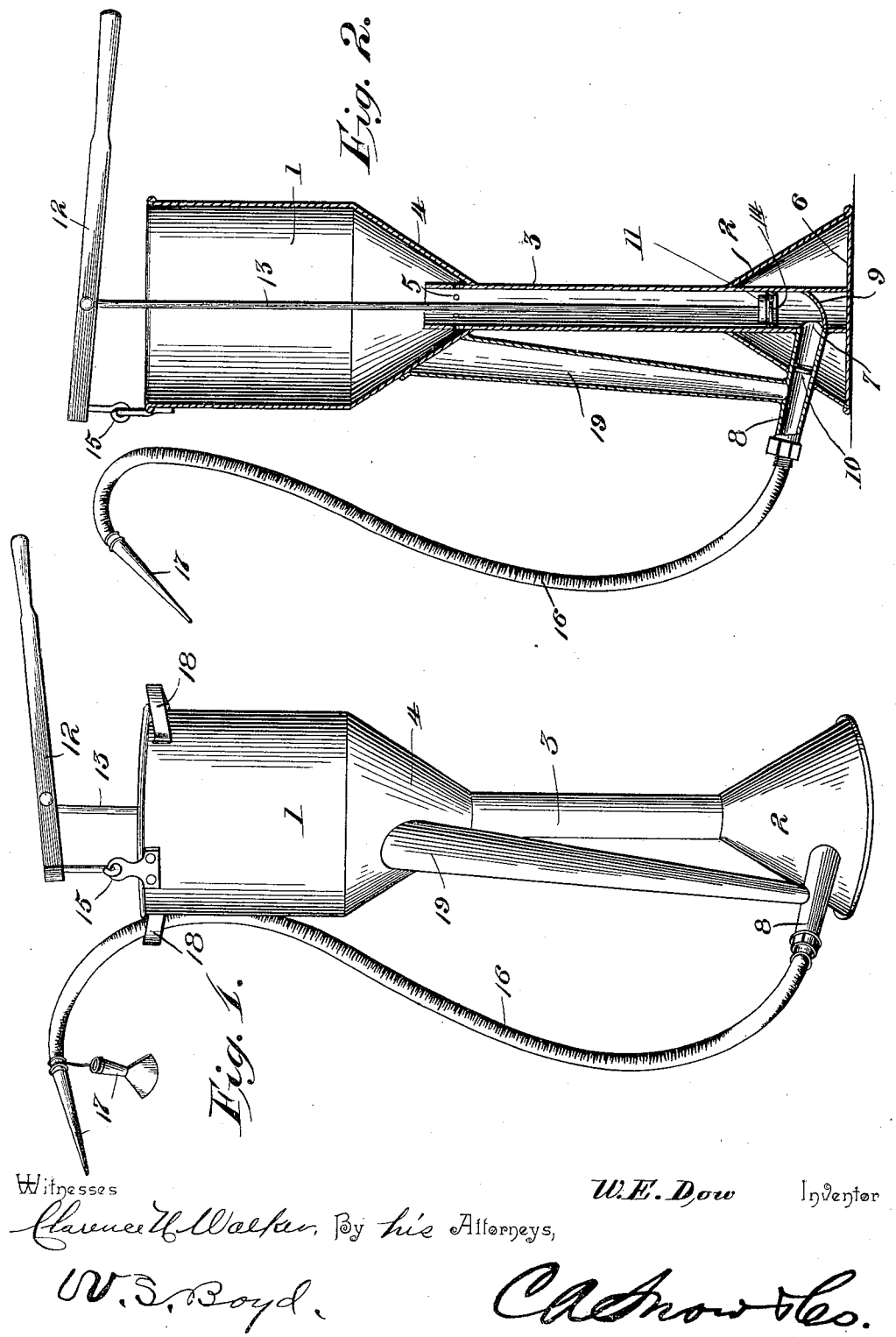
Witnesses
Clarence H. Walker,
W. S. Boyd.
W. E. Dow  Inventor
By his Attorneys,
C. A. Snow & Co.

United States Patent Office.

WILLIAM EDWIN DOW, OF LITTLETON, NEW HAMPSHIRE.

SPRAYING-PUMP.

SPECIFICATION forming part of Letters Patent No. 654,235, dated July 24, 1900.

Application filed November 16, 1899. Serial No. 737,192. (No model.)

*To all whom it may concern:*

Be it known that I, WILLIAM EDWIN DOW, a citizen of the United States, residing at Littleton, in the county of Grafton and State of New Hampshire, have invented a new and useful Spraying-Pump, of which the following is a specification.

My invention relates to pumps, and more particularly to that class which are used for spraying liquids of various kinds upon trees and plants for the purpose of cleaning them or destroying insects and other parasites which are destructive of the life of the trees or of their foliage.

The invention has for its object to produce such a device as shall be compact, convenient, and efficient; and it consists in the combination and improved construction of parts of such a pump, as will be hereinafter more particularly set forth.

In the accompanying drawings, in which the same reference-numeral indicates a corresponding part in each of the views in which it occurs, Figure 1 is a perspective view of a pump embodying my invention, and Fig. 2 is a sectional view of the same.

Referring more particularly to the drawings, 1 indicates the reservoir of my pump, which is supported at a suitable height by the base 2 and the stem or cylindrical support 3. The reservoir is preferably cylindrical, with a tapering or funnel-shaped bottom 4, which is securely soldered or brazed to the stem at a suitable distance below the top thereof. The stem is provided with a series of holes or perforations 5 immediately above the bottom of the reservoir, through which the contents of the reservoir may pass to the stem. In case the liquid holds a solid in solution which precipitates readily this construction will cause the solid to be carried into the stem and from there be thrown out by the operation of the apparatus without the agitation of the liquid necessary with a flat-bottomed reservoir.

The base 2 is preferably pyramidal, with the stem 3 secured to the apex and also to the bottom 6, which may be of such size as to support the apparatus in an upright position without further attention from the operator. At a short distance from the bottom 6 is a hole 7 in the side of the stem 3, which communicates with a short exhaust pipe or outlet 8, which projects at a slight angle upward and out through the side of the base. Located within the stem, directly below the hole 7, is a false bottom 9, which is preferably slightly curved to deflect the stream of water from the stem to the exhaust-pipe. At a convenient point in the exhaust, preferably adjacent to the stem, is a check-valve 10, which will permit of the liquid passing out from the stem, but which will prevent its return.

Within the stem, which is of such a size as to permit of the flow of sufficient material to properly spray the trees or plants, is a plunger 11, which is connected with a handle 12 by a rod 13. The plunger fits closely within the stem and is provided with ordinary downwardly-opening valves 14, which will permit the liquid to pass as the plunger is drawn upward, but which will prevent its passage as the plunger moves downward. The handle is preferably pivotally secured, as at 15, to one side of the reservoir, and the other end extends far enough beyond its connection with the piston-rod 12 to act as a lever, and thereby enable the operator to force the piston or plunger downward with sufficient energy to throw a stream or spray to the top of the ordinary tree—say forty feet.

Secured to the outer end of the exhaust-pipe, which is preferably wired, as is also the top of the cylinder, to give them additional strength and rigidity is a flexible discharge pipe or hose 16, the end of which is provided with a jet or spray attachment 17. If desired, the end of the hose may be passed through one of the handles 18, by means of which the device is carried from place to place, and should project far enough through the handle to be grasped by the hand of the operator and turned so as to direct the stream of liquid where desired, or it may be removed from the handle when in use and held by one hand of the operator while the lever is operated by the other hand. The attachments 17 are interchangeable, so as to adapt the pump to as many uses as necessity may require—as, for instance, a stream to reach the tops of the trees and a broad flat stream to cover the plants in beds or close to the ground. The discharge-openings of the attachments are preferably smaller than the stem and the discharge-pipe, so that the force upon the liquid by the plunger will cause the liquid to be thrown with considerable force and velocity as it leaves the openings.

To cause the discharge from the nozzle to be continuous, I employ an air-chamber 19, which communicates with the exhaust-pipe 8 and has its upper end secured to the bottom of the reservoir 1. The air-chamber is preferably made slightly tapering, so that the mouth is smaller than the cross-section of the upper portion, whereby it takes the liquid longer to escape by the expansion of the air than it did to enter, being forced in by the action of the plunger. By securing the top of the air-chamber to the bottom of the reservoir it acts as a brace and the parts are more rigid than they would be otherwise, and a portion of the bottom of the reservoir may also act as a bottom for the air-chamber. The pipe 8 is secured at its inner end to the stem, its intermediate portion is secured to the wall of the base, and its outer end is secured to the air-chamber. In operating my improved force-pump the proper nozzle is secured to the hose, and the liquid to be applied is introduced into the reservoir, from whence it will pass by gravity to the bottom of the stem and out through the discharge-pipe until it is at the same level in the hose as it is in the reservoir. The operator then lifts the handle, which causes the plunger to pass freely up through the liquid in the stem. He then forces down upon the handle, which will cause the liquid beyond the plunger to be carried forward and ejected from the nozzle in whatever direction the end of the hose is directed by the operator. As the plunger is forced downward the liquid in the reservoir will follow it by gravity, so that the only force required to operate the pump will be what is necessary to throw the stream.

The parts are preferably made of suitable non-corrosive material, so as not to be effected by the different materials which may be used and yet have the apparatus so light that it can be easily transported from place to place, as required.

Having described my invention, I claim—

1. In a spraying-pump, the combination with a reservoir and a base, of a stem therebetween, the top of the stem projecting through the bottom of the reservoir and perforated, and the bottom being provided with a discharge-opening, a curved false bottom in the stem below said opening a valved plunger in the stem, a discharge-pipe leading from the opening at the bottom of the stem and a flexible hose secured to the end of said pipe, the outer end of which is adapted to be provided with an attachment.

2. In a spraying-pump, the combination with a reservoir the bottom of which is funnel-shaped, of a conical base, a perforated cylindrical stem projecting through the bottom of the reservoir at one end, and through the apex of the base at the other, the end within the base being secured to the bottom thereof and provided with an opening adjacent thereto, a curved false bottom secured within the stem below said opening, a valved plunger within the stem, an exhaust-pipe leading from the opening in the lower end of the stem, an air-chamber communicating with the pipe, and a flexible hose secured to the pipe the free end of which is adapted to be provided with interchangeable attachments.

3. In a spraying-pump, the combination with a reservoir of a stem leading from the bottom thereof, and provided with an exhaust-opening, a valved plunger within the stem, a conical base secured at its bottom and apex to the end of the stem, an air-chamber secured to the bottom of the reservoir, a discharge-pipe secured at its inner end to the stem around said exhaust-opening, at its intermediate portion to the wall of the base and at its outer end to the air-chamber, and a flexible hose secured to the pipe, the free end of which is adapted to be provided with interchangeable attachments.

4. In a spraying-pump, the combination with a reservoir provided with open handles, of a lever pivotally secured to one side of the reservoir, a stem projecting from the bottom of the reservoir a valved plunger in the stem, a rod connected with the plunger and the lever, a base at the bottom of the stem, a discharge-pipe leading from the bottom of the stem and a flexible hose secured to the pipe, the free end of which is adapted to project through one of the handles of the reservoir and to be provided with an attachment.

In testimony that I claim the foregoing as my own I have hereto affixed my signature in the presence of two witnesses.

WILLIAM EDWIN DOW.

Witnesses:
THOMAS F. CLIFFORD,
BENJAMIN W. CANDE.